Jan. 4, 1966　　　F. N. COLLAMORE　　　3,227,941
BRUSHLESS MOTOR GENERATOR
Filed Dec. 4, 1961　　　　　　　　　　　　　3 Sheets-Sheet 1

INVENTOR.
FRANK N. COLLAMORE
BY
*Richard F. Carr*
ATTORNEY

INVENTOR.
FRANK N. COLLAMORE
BY
ATTORNEY

Jan. 4, 1966   F. N. COLLAMORE   3,227,941
BRUSHLESS MOTOR GENERATOR
Filed Dec. 4, 1961   3 Sheets-Sheet 3

INVENTOR.
FRANK N. COLLAMORE
BY
ATTORNEY

United States Patent Office 3,227,941
Patented Jan. 4, 1966

3,227,941
BRUSHLESS MOTOR GENERATOR
Frank N. Collamore, Los Alamitos, Calif., assignor, by mesne assignments, to Teledyne, Inc., Gardena, Calif., a corporation of Delaware
Filed Dec. 4, 1961, Ser. No. 163,007
10 Claims. (Cl. 322—16)

This application is a continuation in part of my copending application Serial No. 44,980, filed July 25, 1960, for Motor-Generator, now abandoned.

This invention pertains to a motor-generator, and more particularly to a brushless, synchronous motor-generator.

The device of this invention includes a number of rotating units mounted on a common shaft, including the fields of a synchronous motor and a synchronous generator, the armature of an alternating current exciter, and a rectifier assembly. The fields of the motor and generator are connected in parallel, being supplied from the one common rectified excitation source. There are no electrical contactors or connections between the stationary and rotating parts.

By virtue of this arrangement a simplified and reliable motor-generator set is provided that is brushless and requires but one exciter. Changes in generator field excitation required to regulate the output voltage during load variations also result in changes in motor field excitation. As a result, the motor operates at a nearly constant power factor under varying load conditions. In addition, below certain generator field impedance values, the parallel-connected motor and generator fields obviate the necessity for a motor field discharge resistor during starting. Where generator field impedance is relatively high, a voltage limiting device is included to protect the rectifier bridge against excessive reverse surge voltages.

It has been known in the past to construct brushless dynamo-electric machines of the self-excited generator type. However, until the present invention, a completely brushless motor-generator has not been devised. Heretofore it has been necessary to utilize reluctance type synchronous motors, which are larger, more costly and operate at a lower input power factor than in the present instance.

Accordingly, it is a principal object of this invention to provide a synchronous motor-generator having no electrical contacts or connections between the stationary and rotating parts, and wherein all electrical connections for input and output power are made to stationary parts.

It is also an important object of this invention to provide a synchronous motor-generator wherein the motor and generator field windings are connected in parallel, thereby for lower generator field impedances eliminating the need for a discharge resistor in the motor field winding upon motor starting since the generator field winding serves as the motor field winding discharge resistor during starting.

Another object of the present invention is to provide a motor-generator set comprising a rotating field synchronous motor, a rotating field synchronous generator, a rotating armature alternating current exciter and a rotating rectifier assembly, with all rotating parts assembled on a common shaft.

It is a further object of this invention to utilize only one exciter and rectifier to provide excitation for both the motor and generator fields.

An additional object of this invention is to provide a motor-generator of simplified, compact and relatively low cost construction, yet which is more reliable than previous motor-generator sets.

These and other objects and advantages of this invention will become apparent to those skilled in the art after reading the present specification and the accompanying drawings forming a part thereof, in which.

Figure 1:
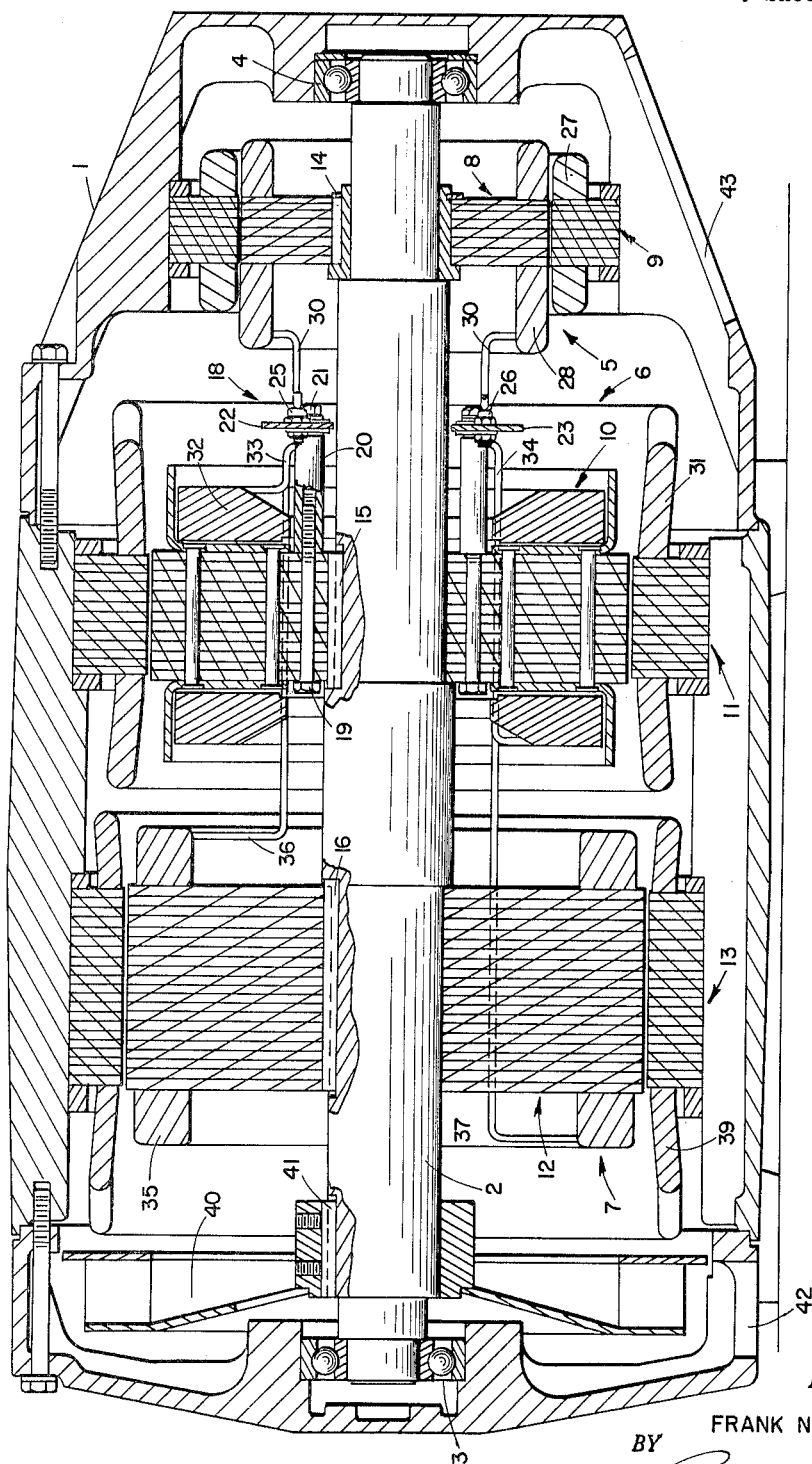
FIG. 1 shows a longitudinal section through the motor-generator embodying my invention.
Figure 2:
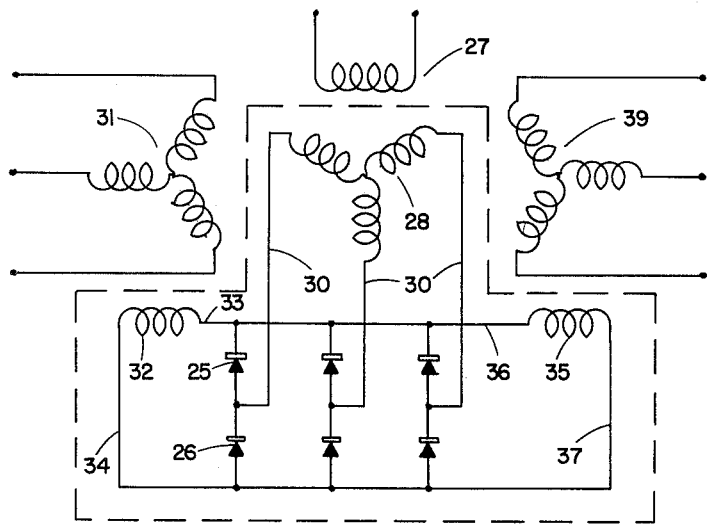
FIG. 2 is a schematic diagram of the circuit connections for this machine.

Referring first to FIG. 1, the dynamoelectric machine of this invention includes a frame or housing 1 which rotatably supports shaft 2 in end bearings 3 and 4. The machine has three separate magnetic circuits, including one associated with an exciter 5, another with a motor 6 and the third with generator 7.

The magnetic circuit of exciter 5 comprises a rotor 8 and a stator 9. Similarly, rotor 10 and stator 11 are included in the magnetic circuit of motor 6, while the magnetic circuit of generator 7 is made up of rotor 12 and stator 13. Rotors 8, 10 and 12 are mounted on shaft 2, and rotatably secured to the shaft by keys 14, 15 and 16, respectively.

Preferably, the rotors and stators are of a laminated construction. The motor and generator field structures may be of any suitable type and may consist of a suitable member of salient poles carrying the direct current field windings.

Figure 3:
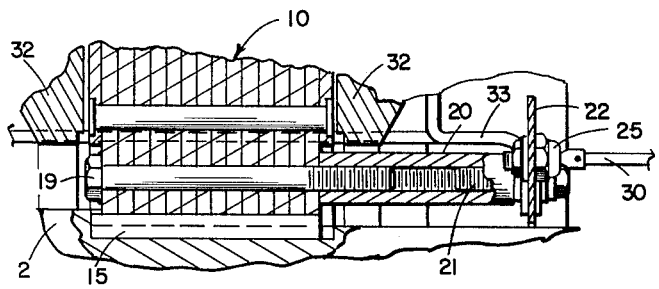
FIG. 3 is an enlarged fragmentary sectional view illustrating the mounting of the collector plates and diode rectifiers.
Figure 4:
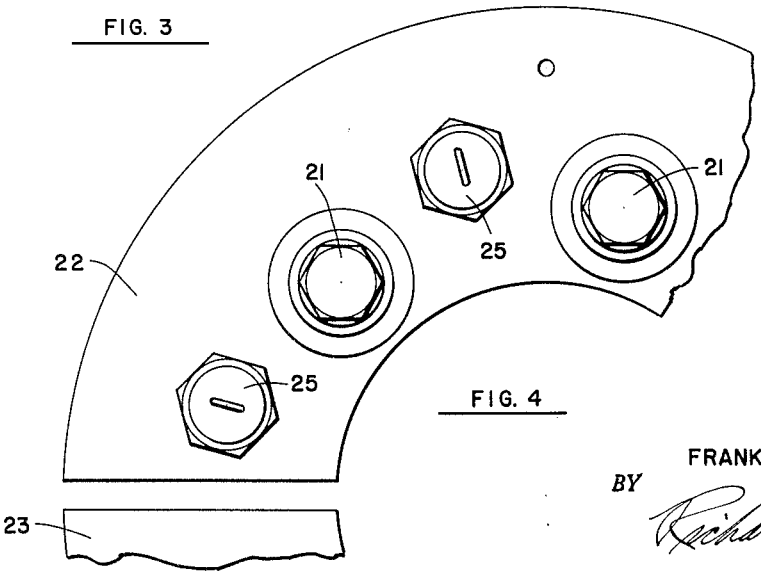
FIG. 4 is an enlarged fragmentary elevational view of the diode collector plates.

A diode rectifier assembly 18 likewise is rotatable with shaft 2, conveniently being attached to rotor 10 of the motor 6. This is accomplished by means of bolts 19 extending through the rotor 10 parallel to its axis to be received in internally threaded tubular members 20 (see FIG. 3). The latter members and the heads of bolts 19 may be tack welded to the outer laminations of rotor 10 to assure that the connections will not loosen.

Screws 21 also are received in members 20 to secure substantially semicircular collector plates 22 and 23 thereto. Three semiconductor dry contact type rectifiers in the form of diodes 25 are carried by collector plate 22 with their direct current outputs connected in parallel thereby. The plate 23 mounts three similar diodes 26, serving as a parallel connection for those diodes. The collector plates also act as a heat sump for the diodes.

The stator 9 of alternating current exciter 5 includes a direct current field winding 27 receiving excitation from an external source. Rotor 8 of the exciter mounts on armature winding 28 in which a polyphase alternating current is generated upon rotation of the shaft and the application of a direct current excitation to stator field winding 27. The polyphase output of exciter 5 is applied to the rectifier assembly by means of connectors 30.

Wound on motor stator 11 is armature winding 31 which is connected to an external alternating current power supply. While described herein as being of a polyphase nature, if desired the motor could be single phase instead. Field winding 32 of the motor is carried by the rotor 10, and through connector 33 receives direct current excitation from the output of collector rings 22 of the rectifier assembly. This field winding also connects to the other collector plate 23 through lead 34.

Mounted on rotor 12 of generator 7 is a direct current field winding 35, also through connector 36 receiving direct current excitation from collector plate 22 of the rectifier assembly. The circuit for the generator field is completed by lead 37 connecting to the collector plate 23 and diode rectifiers 26.

By this arrangement, therefore, the fields of both the motor and generator are connected in parallel, receiving their excitation from a single, common source.

Stator 13, which is associated with rotor 12 of the generator, supports armature winding 39 in which an alternating current is generated upon rotation of the shaft and excitation of field winding 35. Again, polyphase is preferred, although circuitry for single phase current also could be used.

During operation of the dynamoelectric machine of this invention, cooling is provided by a fan 40 positioned at the outboard end of the shaft adjacent generator 7, secured to the shaft by key 41. This fan, in conjunction with openings 42 and 43 on the lower side of housing 1, gives a continuous circulating airflow for cooling the motor-generator set.

Since the exciter armature, the rectifier assembly, and the motor and generator fields are all mounted on the same rotating shaft, they can be directly connected together. The generator and motor thus are provided with direct current excitation without requiring any commutator, brushes, or slip rings.

Starting of the unit is accomplished by means of a motor damper winding in the normal mode for starting a synchronous machine. Application of polyphase current to motor stator winding 31 induces a current in the rotor winding (not shown) and sets up the necessary magnetic circuit therebetween to cause rotor 10 to come up to speed where it is pulled into synchronism.

Rotation of shaft 2 by means of motor rotor 10 likewise causes exciter armature 8 to turn. With the application of a direct current to exciter field winding 27, an alternating current is developed in rotor winding 28 of the exciter. The output voltage generated in armature winding 28 is a function of the excitation current supplied to field winding 27. The alternating current generated in armature winding 28 is rectified to direct current by the rotating rectifier assembly 18. This direct current then is applied to the parallel-connected field windings 32 and 35 of the motor and generator.

It is an important feature of this invention that the rectified excitation current is applied directly to the motor and generator in parallel by means of permanent connections. Normally, synchronous motor starting has required that the motor field windings either be short-circuited or that a discharge resistor be included in the motor circuit. This is necessary because otherwise the high starting voltage would cause the motor insulation to break down. As the motor approached or attained its normal running speed, the resistance would be removed to allow the machine to operate as a synchronous device. Cutting in and out of the field discharge resistor required the provision of an automatic switching device having make and break contacts.

The present arrangement not only does away with one excitation system, but also in many instances eliminates the necessity for including a motor field discharge resistor in the motor field circuit, or for protecting it by any other similar means. It further eliminates the requirement for any switching device, as well as the problems inherent with make and break contacts. In my invention, the inductive impedance of the generator 7 connected in parallel with the motor field winding can serve to limit the initial voltage surge in the motor field circuit and allow elimination of all such switching devices, or other means requiring the use of intermittent make and break contacts. Furthermore, the use of a common exciter for both the motor and generator fields causes the motor to operate at close to a constant power factor even though load conditions are not constant. This is because changes in generator field excitation necessary to regulate the output voltage during load variations also result in changes in motor field excitation.

The above described arrangement in which the generator field serves as the current path during starting is quite satisfactory for many purposes, particularly for machines operating on higher frequencies such as 400 cycles per second. However, for larger units and those utilizing 60 cycle current, certain problems can be encountered. This may arise from a relatively high generator impedance which can break down the diodes 25 and 26. At the moment of starting, the alternating current induced in the motor field can follow the shortcircuiting path of the diodes 25 and 26 on the negative half cycles. However, on the positive half cycles these diodes block the current flow in the opposite direction. Without a path for the negative field current, the field voltage will rise to a high value which can damage these rectifiers. Excessive reverse voltage even for a brief period can destroy the rectifiers.

Figure 5:
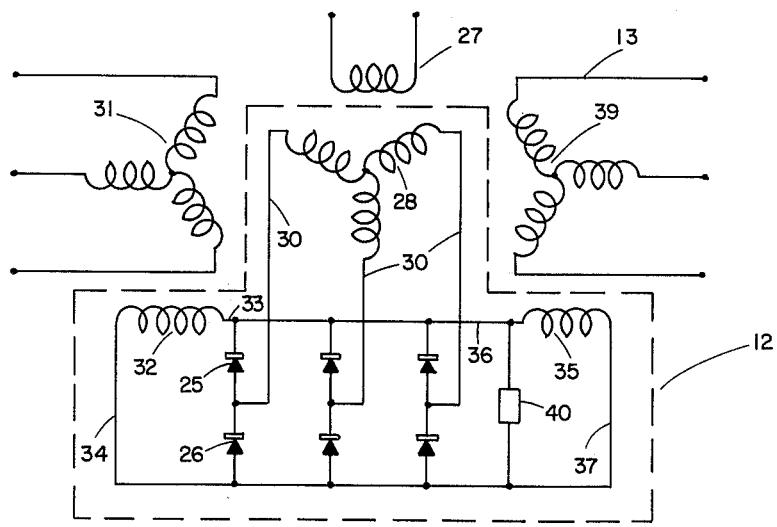
FIG. 5 is a schematic diagram similar to FIG. 2 showing the addition of a voltage limiting device in parallel with the generator field.
Figure 6:
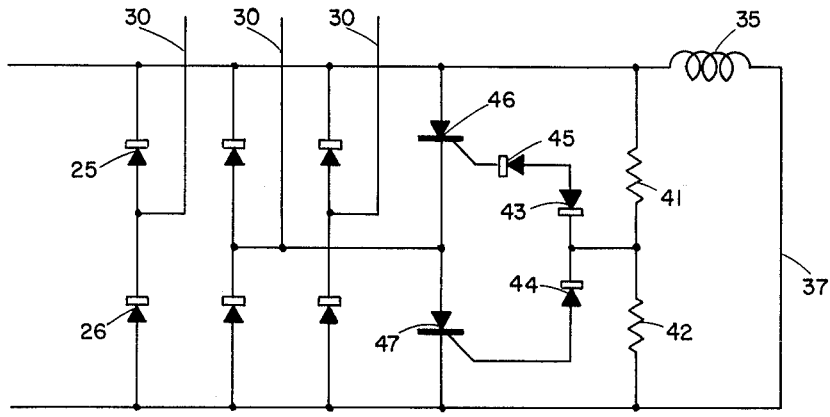
FIG. 6 is a schematic detail diagram of a network usable in the circuit of FIG. 5.

This difficulty is overcome by the arrangement illustrated in FIGS. 5 and 6. Here there is a voltage limiting device 40 connected in parallel with the generator field. This unit, which is carried by the rotating portion of the dynamoelectric machine of this invention, provides a short circuit current path for the induced voltage in the generator field so that the diodes 25 and 26 no longer must block the current flow in the positive half cycle. The current merely is conducted through the voltage limiting device 40 which provides a complete circuit with the generator field, independent of the diodes 25 and 26. Therefore, high surge voltages cannot cause damage to the diodes when the arrangement of FIG. 5 is utilized.

The voltage limiter 40 may take various forms. In one embodiment it is simply a resistor of appropriately selected value that provides a more ready current path than the transistors. Variable resistance devices also may be utilized. These should be of the type that decrease in resistance value with increasing applied voltage. This will allow a free flow of current at high surge voltages, but will not allow excessive current leakage during normal operation.

A third alternative is to utilize a circuit consisting of devices electrically connected so as to form a voltage limiting network. This has the advantage of allowing the surge suppressor to be effectively turned off during normal operation of the unit, resulting in slightly higher efficiency.

An arrangement of the latter type may be seen by reference to FIG. 6. Here the unit 40 includes resistances 41 and 42 with an intermediate connection to Zener diodes 43 and 44. The former is connected through blocking diode 45 to the gate of silicon controlled rectifier 46. The Zener diode 44 connects to the gate of the silicon controlled rectifier 47. The silicon controlled rectifiers 46 and 47 are in effect one-way switches, blocking current flow in the direction of conduction of rectifiers 25 and 26. In the forward direction current flow is blocked only until a small amount of current is applied to the gate. The Zener diodes 43 and 44 act as voltage sensitive devices to turn on the rectifiers 46 and 47 at predetermined voltages.

As a result of this arrangement, the rotating diodes 25 and 26 will continue to conduct on the negative half cycle of the alternating current during the starting time. For the positive half cycle the induced field current reverses. These diodes then block the current which therefore has only the path provided by the voltage limiting device. At some voltage level across the resistances 41 and 42, the Zener diodes will be caused to fire. In one embodiment, when there are 12 volts across resistor 42, the avalanche voltage of Zener diode 44 is exceeded and it is made to conduct. This places a voltage on the gate of the silicon rectifier 47 causing it to go into full conduction. This directs all of the field voltage to silicon rectifier 46. Zener diode 43 fires almost immediately and the silicon rectifier 46 is turned on. The short circuit across the diodes 25 and 26 thereby is completed as the silicon rectifiers provide a low resistance current flow path. These rectifiers are turned on in only a few microseconds, effectively precluding any excessive surge voltage from being impressed in the reverse direction across the diodes 25 and 26.

As the surge voltage decays when a unit approaches rated speeds, the diodes 43 and 44 will cease to conduct. This turns off the circuit of the voltage control unit 40. The result is a particularly efficient unit because of the fact that the short circuit path is cut out as synchronous speed is reached. However, the components of this network must be of rugged construction in order to withstand centrifugal forces occurring at high speed rotation of the shaft 2.

While a particular embodiment of this invention has been illustrated and described herein, it will be apparent that various changes and modifications may be made in the construction and arrangement of the various parts without departing from the spirit and scope of this invention in its broader aspects, or as defined in the following claims.

I claim:

1. An alternating current dynamoelectric machine comprising
 a rotatable shaft,
 a first direct current winding on said shaft,
 a first stationary alternating current armature winding associated with said first direct current winding;
 a second direct current winding on said shaft;
 a second stationary alternating current armature winding associated with said second direct current winding;
 an exciter for energizing said first and second direct current windings,
  said exciter including a rotatable alternating current armature winding on said shaft,
  and a stationary direct current field winding;
 means on said shaft for rectifying the output of said exciter alternating current armature winding;
 circuit means connecting the output of said rectifying means to said first and second direct current field windings in parallel,
 and a voltage limiting means connected in parallel with said second direct current winding.

2. A device as recited in claim 1 in which said voltage limiting means comprises a resistor means.

3. A device as recited in claim 1 in which said voltage limiting means includes
 one-way switch means for blocking current flow in the direction of conduction of said rectifying means,
  and switch means being controllable for conducting in the opposite direction.

4. A device as recited in claim 3 in which
 said one-way switch means comprises silicon controlled rectifier means,
 and including voltage sensitive means connected to the gate of said silicon controlled rectifier means.

5. In combination,
 a dynamoelectric machine having a rotatable shaft;
 a first direct current field winding on said shaft;
 a first stationary armature winding surrounding said first field winding,
  said armature having an alternating current input;
 a second direct current field winding on said shaft;
 a second stationary armature winding surrounding said second field winding,
  said second armature having an alternating current output;
 an exciter including
  a stationary field winding having a direct current input
  and an armature winding on said shaft delivering an alternating current output;
 a rectifier carried by said shaft and converting the alternating current from said exciter armature to direct current,
  said rectifier being connected in parallel with both of said first and second direct current field windings.

6. A device as recited in claim 5 including in addition voltage limiting means connected in parallel with said second field winding.

7. The combination set forth in claim 5 wherein said rectifier includes a semiconductor dry-contact type rectifier.

8. A synchronous motor-generator machine comprising
 a synchronous motor having an alternating current input;
 a synchronous generator having an alternating current output,
  said motor and generator including a common rotatable shaft upon which the field structure and field windings of said motor and said generator are mounted;
 an exciter having its armature mounted on said common rotatable shaft;
 and a rectifier carried by said shaft connected to said exciter armature and to the field windings of said motor and said generator
  whereby said exciter armature and said motor and generator field windings are connnected in parallel.

9. A synchronous motor-generator machine as set forth in claim 8 wherein
 said motor, generator and exciter each comprise separate magnetic circuits,
  wherein one portion of each of said magnetic circuits is mounted on said rotatable shaft,
 and wherein all electrical connections are made between relatively stationary portions of the machine,
  whereby no brushes, commutators and split rings are required.

10. A synchronous motor-generator machine as set forth in claim 8 wherein the alternating current output of said exciter is rectified by a dry-contact type rectifier before application to the motor and generator field windings.

References Cited by the Examiner

UNITED STATES PATENTS

| 2,282,196 | 5/1942 | Lynn | 307—57 |
| 2,412,933 | 12/1946 | Wright et al. | 307—57 |
| 2,913,656 | 11/1959 | Bliss | 322—25 |
| 2,966,623 | 12/1960 | Mishkin. | |

LLOYD McCOLLUM, *Primary Examiner.*